No. 758,913. PATENTED MAY 3, 1904.
C. G. HAMPTON.
DETACHABLE LINK CHAIN.
APPLICATION FILED NOV. 24, 1903.
NO MODEL.
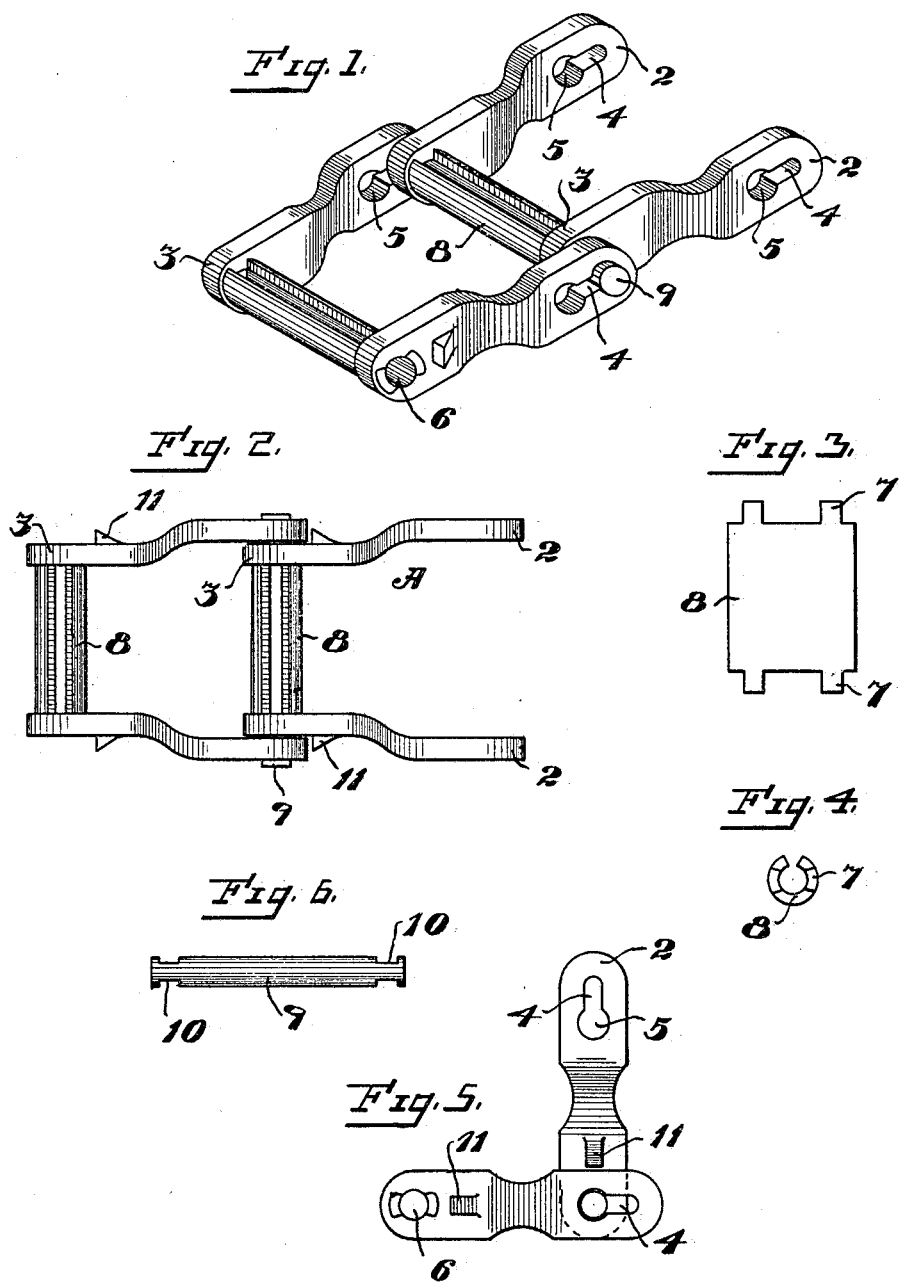
Witnesses
Inventor,
Calvin G. Hampton
By Geo. H. Strong
Atty No. 758,913. Patented May 3, 1904.

UNITED STATES PATENT OFFICE.

CALVIN G. HAMPTON, OF RYDE, CALIFORNIA.

DETACHABLE-LINK CHAIN.

SPECIFICATION forming part of Letters Patent No. 758,913, dated May 3, 1904.

Application filed November 24, 1903. Serial No. 182,470. (No model.)

*To all whom it may concern:*

Be it known that I, CALVIN G. HAMPTON, a citizen of the United States, residing at Ryde, in the county of Sacramento and State of California, have invented new and useful Improvements in Detachable-Link Chains, of which the following is a specification.

My invention relates to improvements in what are known as "detachable-link chains," such as are used for driving purposes.

It consists in the construction of the sides of the links with elongated slots punched through them, said slots at one end having an enlargement and the slots at the other end being adapted to receive the ends of tubular sleeves, which are also formed and bent separately, so as to be removable from the side links. The pin connecting the adjacent links passes through the tubular sleeves and is flattened at the ends to interlock with the narrower portions of the slots of the links with which it is engaged.

My invention also comprises details of construction, which will be more fully explained by reference to the accompanying drawings, in which—

Figure 1 is a perspective view of a portion of chain, showing my invention. Fig. 2 is a plan view of the same. Fig. 3 is a blank sleeve before shaping. Fig. 4 is the sleeve after shaping. Fig. 5 shows link in position to be detached. Fig. 6 is a view of locking-pin.

In the construction of detachable-link chains the connecting-pin is flattened where it passes through one of the overlapping pairs of links and is slidable in a slot therein and is turnable in a circular opening in the other pair of links. This construction gives a comparatively small bearing for the movable portions of the joint, and they therefore wear rapidly, and it is necessary to replace the whole link. Link chains have also been made by casting the sides with a sleeve at one end through which the pin passes.

It is the object of my invention to make a chain with each joint formed of sides and sleeves to which they are separably united, and the pin which unites the contiguous links passes through this sleeve and has its outer ends flattened to slide in corresponding slots in the overlapping portion of the contiguous links. A stop is fixed to or formed upon the narrow ends of the interior overlapping links, which when the chain is extended abuts against the corresponding ends of the overlapping outer links, and thus prevents the links from changing position or being disengaged until they have been turned at right angles with each other and the pin slipped along its slot until it reaches the circular enlargement of said slot, through which it may then be withdrawn.

As shown in the accompanying drawings, the links are bent at A, so that the ends 2 stand in a plane wider than the ends 3, and this allows the ends 3 to be turnable inside of the ends 2 when the chain is assembled. These links are stamped or otherwise formed and have slots 4 made in the wider or more separated ends, these slots terminating at the inner end in circular openings 5, so that said slots resemble a keyhole. The slots at the opposite and less separated ends of the links are made as shown at 6 and adapted to receive the ends 7 of the sleeve 8. This sleeve is bent or formed from a blank, which is shown in its flat or extended condition at Fig. 3, in which form the blanks are first stamped out. When bent into their cylindrical shape and left slightly open on one side, the ends 7 will by compression of the inner portion and the extension of the outer portion take the shape shown in Fig. 4, and the slots 6 in the ends of the links are so formed as to receive these projecting tongues of the sleeves, and thus interlock the sides and the sleeves. I am thus enabled to form the side pieces of the links and the sleeves separately.

In the use of the chain the principal wear and friction is brought upon the sleeves, and these will in time be worn and need renewing, which is easily done by removing the worn sleeve and inserting another, thus preserving the sides, which have the least wear, for an indefinite length of time. The tubular sleeves have an interior diameter adapted to receive the connecting-pins 9, the central portion of which is cylindrical and of such diameter as to fit and turn easily within the sleeve. This provides a bearing equal in length to the distance between the parts 3 of the links, and the wear upon the pin turning within this sleeve is very slight. The outer ends of the pins passing through the portions 2 of the links are flattened, as shown at 10, and these flattened portions are of such thickness that they are slidable in the portions 4 of the slots made in the ends 2 of the chain-link side pieces, and when the chain is assembled these pins will be drawn to the outer ends of the slots 4, where they will be locked and prevented from turning. No heads are necessary upon these pins, the outer ends of which may be extended slightly and sufficiently to hold the parts together.

Upon the outer portions 3 of the links and near to the curve or bend between these and the wider portions 2 are fixed or formed lugs or spurs 11, at such points that when the chain is assembled and extended these spurs project just behind the ends of the parts 2 of the links, and thus act as stops to prevent parts of the chain moving so that the pins might accidentally move along to the circular opening 5, in which position it would be possible for them to slip out and allow the chain to separate. When it is desired to separate the chain, the links are turned to stand at right angles with each other, as shown in Fig. 5, and this brings the stops 11 into position where they can move parallel with the sides of the links until the pins 9 are brought into line with the circular opening 5 at the end of the slot 4. In this position it is possible to push the pin through the sleeve and remove it, and thus disengage the chain. The chain is assembled in the same manner by first turning the two separated links to stand at right angles with each other, then inserting the pin until the flattened portions 10 are in line with the portions 2 of the link sides, when the links can be moved so that these flattened portions will slide into the narrower portion of the channel 4, and when the lug 11 has passed beyond the end of the link the links can then be turned into line with each other, and the lug will stand opposite the end of the link and prevent the return of the parts.

The sleeves are open along the top for the purpose of convenient lubrication.

The sleeves 8 being removable are also reversible, so that when worn upon one side they may be turned end for end, and thus present the opposite side for wear.

Having thus described my invention, what I claim, and desire to secure by Letters Patent, is—

1. The combination in a detachable-link chain of independent link sides each having a mortise in one end and a keyhole-slot in the opposite end said link sides so disposed that the keyhole-slotted end of one link side overlaps the mortised end of the adjacent link on that side, sleeves fitting between opposite side links and having tongues to interlock in the mortised ends thereof, and connecting-pins passing through the sleeves and the keyhole-slots of the adjacent and overlapping link sides and having flattened portions to fit the narrowed portions of said slots.

2. A detachable-link chain composed of pairs of links with the links of each pair bent and each provided at one end with a mortise and at the opposite end with a keyhole-shaped slot, said links so disposed that the keyhole-shaped slotted ends of one pair overlap the mortised ends of an adjacent pair, tubular sleeves extending between each pair of links and having tenons by which they are interlocked in the mortises thereof, and pins passing through the sleeves and the slots of an adjacent pair of links, and having flattened portions coincident with the narrowed portions of said slots.

3. The combination in a detachable-link chain of independent sides and sleeves, said sleeves being adapted to extend between the ends of the links and to be removably secured thereto, said sides having keyhole-shaped slots formed in the opposite and more separated ends which inclose the first-named ends of the contiguous links, pins fitting and turnable within the tubular sleeves having the outer ends flattened to engage with the slots in the contiguous overlapping links, and stops formed upon the outside of the links near the sleeves and adapted to engage with the opposite overlapping ends of the contiguous links.

4. In a link chain, the link sides bent so that the opposite ends stand in different planes, said sides having the contiguous ends overlapping and the overlapping end of one link side provided with a mortise and the corresponding end of the companion link side provided with a keyhole-slot, sleeves fitting between opposite side links and having their ends fitted in the mortised ends thereof, and pins passing through the sleeves and having their ends passing through and locking in the keyhole-slotted ends of the adjacent and overlapping link sides.

In testimony whereof I have hereunto set my hand in presence of two subscribing witnesses.

CALVIN G. HAMPTON.

Witnesses:
S. H. NOURSE,
HENRY P. TRICOU.